(12) United States Patent
Soltani Bozchalooi et al.

(10) Patent No.: US 11,069,161 B2
(45) Date of Patent: Jul. 20, 2021

(54) ADAPTIVE SENSOR FUSION

(71) Applicant: Ford Global Technologies, LLC, Dearborn, MI (US)

(72) Inventors: Iman Soltani Bozchalooi, Sacramento, CA (US); Francis Assadian, Davis, CA (US); Lisa Scaria, Milpitas, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 191 days.

(21) Appl. No.: 16/587,084

(22) Filed: Sep. 30, 2019

(65) Prior Publication Data
US 2021/0097783 A1 Apr. 1, 2021

(51) Int. Cl.
| | | |
|---|---|---|
| *G07C 5/08* | (2006.01) | |
| *G07C 5/00* | (2006.01) | |
| *G05D 1/02* | (2020.01) | |
| *H04L 29/08* | (2006.01) | |
| *G05D 1/00* | (2006.01) | |
| *G01S 13/86* | (2006.01) | |

(52) U.S. Cl.
CPC ............ *G07C 5/085* (2013.01); *G01S 13/865* (2013.01); *G05D 1/0088* (2013.01); *G05D 1/0094* (2013.01); *G05D 1/024* (2013.01); *G05D 1/0272* (2013.01); *G07C 5/008* (2013.01); *G07C 5/0808* (2013.01); *H04L 67/12* (2013.01)

(58) Field of Classification Search
CPC ..... G05D 1/0088; G01S 13/865; G01S 7/417; G07C 5/0841
See application file for complete search history.

(56) References Cited

U.S. PATENT DOCUMENTS

| | | |
|---|---|---|
| 5,680,409 A | 10/1997 | Qin et al. |
| 2009/0002148 A1 | 1/2009 | Horvitz |
| 2017/0109644 A1 | 4/2017 | Nariyambut Murali et al. |
| 2018/0126984 A1* | 5/2018 | Liu ................. B60W 10/04 |
| 2019/0279000 A1* | 9/2019 | Pfeifle ............... G06K 9/00791 |

(Continued)

OTHER PUBLICATIONS

Patel et al.; Sensor Modality Fusion with CNNs for UGV Autonomous Driving in Indoors Environments; 2017 IEEE/RSJ Intl. Conf. on Intelligent Robots and Systems (IROS); Sep. 24-28, 2017; Vancouver, BC, Canada (Year: 2017).*

(Continued)

*Primary Examiner* — Michael J Zanelli
(74) *Attorney, Agent, or Firm* — Frank A. MacKenzie; Bejin Bieneman PLC

(57) ABSTRACT

A computer, including a processor and a memory, the memory including instructions to be executed by the processor to determine performance of a plurality of vehicle data sources used to operate a vehicle by evaluating each vehicle data source output data and train a deep neural network to determine reliability for each of the vehicle data sources based on the performance using reinforcement learning. The instructions can further include instructions to combine output data from the vehicle data sources based on the reliability including using the deep neural network to correlate output data from one or more vehicle data sources to the performance to determine how accurately the output data from each vehicle data source corresponds to vehicle performance and operate the vehicle based on combined output data.

20 Claims, 4 Drawing Sheets

(56) References Cited

U.S. PATENT DOCUMENTS

2019/0332923 A1* 10/2019 Gendron-Bellemare ................... G06N 3/0454
2020/0033868 A1* 1/2020 Palanisamy ........... B60W 40/09

OTHER PUBLICATIONS

Fang et al.; Camera and LiDAR Fusion for On-road Vehicle Tracking with Reinforcement Learning; 2019 IEEE Intelligent Vehicles Symposium (IV); Paris, France; Jun. 9-12, 2019 (Year: 2019).*

Gohring et al.; Radar/Lidar Sensor Fusion fo Car-Following Highways; Proc. of the 5th Intl. Conf. on Automation, Robotics and Applications; Dec. 6-8, 2011; Wellington, New Zealand (Year: 2011).*

* cited by examiner

ADAPTIVE SENSOR FUSION

BACKGROUND

Vehicles can be equipped with computing devices, networks, sensors and controllers to acquire data regarding the vehicle's environment and to operate the vehicle based on the data. Vehicle sensors can provide data concerning features of routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
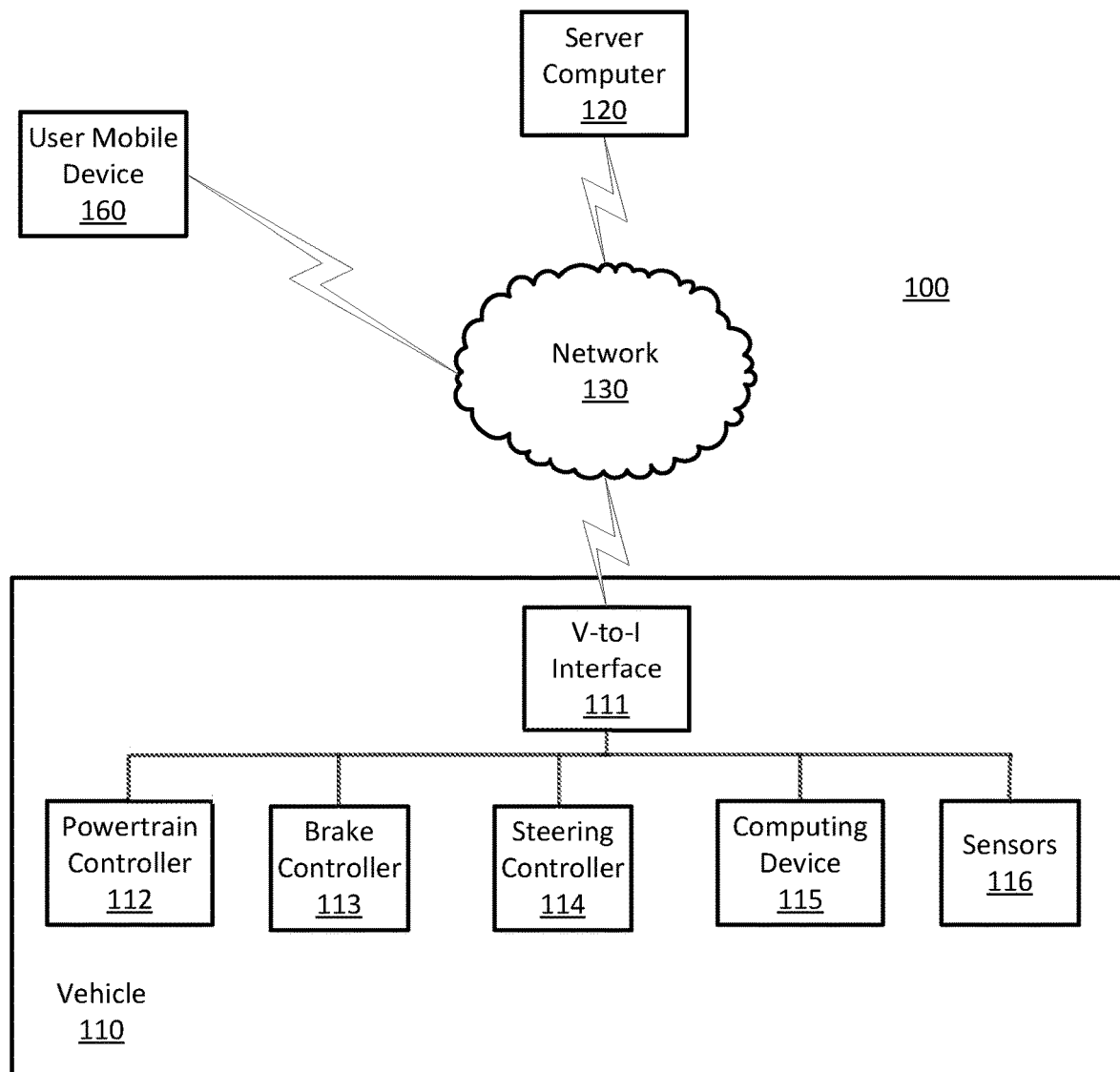
FIG. 1 is a diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more moving objects such as vehicles and pedestrians, etc., in an environment around a vehicle and can be used by a computing device in the vehicle to operate the vehicle.

A computing device in a vehicle can rely on data acquired from a plurality of sensors corresponding to a plurality of different sensor modalities. A sensor modality is defined as the medium and type of data acquired by the sensor. For example, cameras that acquire image data are one modality, lidar sensors that acquire range data based on infrared light are a second modality, radar sensors that acquire range data based on microwave radiation are a third modality and ultrasound sensors that acquire range data based on ultrasonic sound waves are a fourth modality. Sensor data from each of these modalities can be processed by computing devices to determine similar types of data, for example locations of objects in an environment around a vehicle. A computing device can combine output data from a plurality of vehicle data sources corresponding to a plurality of vehicle sensors including a plurality of sensor modalities. For example, a vehicle can include multiple cameras and multiple radar sensors, where each sensor can acquire data that can be processed to determine a location of an object in an environment around a vehicle.

In a vehicle having a plurality of sensors corresponding to a plurality of modalities, not all of the sensor/processor combinations used a vehicle data sources will output data having the same resolution and accuracy. For a given object and distance from a vehicle, for example, different modalities will have different resolutions and accuracies under different environmental conditions. For example, in some inclement weather conditions radar sensors can more accurately acquire data regarding other vehicles on a roadway than a lidar sensor that depends upon transmission of infrared light. In other examples, an ultrasonic sensor can more accurately determine a distance to a nearby parked vehicle while parking than a radar sensor that cannot accurately determine distances less than five to ten meters. Techniques described herein monitor the performance of vehicle data sources with respect to vehicle performance under a variety of vehicle and environmental conditions and train a deep neural network to determine optimal combinations of vehicle data sources. Combining multiple vehicle data sources based on vehicle performance, sensor performance and environmental conditions is referred to herein as adaptive sensor fusion.

Disclosed herein is method including determining performance of a plurality of vehicle data sources used to operate a vehicle by evaluating each vehicle data source output data and training a deep neural network to determine reliability for each of the vehicle data sources based on the performance using reinforcement learning. Output data from the vehicle data sources can be combined using the deep neural network to correlate output data from one or more vehicle data sources to the performance to determine how accurately the output data from each vehicle data source corresponds to vehicle performance; and the vehicle can be operated based on the combined output data. Which data sources to include in the vehicle can be combined based on the reliability. Which data sources are operating correctly can be determined based on the reliability. Performance of each vehicle data source can be based on measures of vehicle operation including at least one of collision probability, fuel consumption, or travel time. Each of the vehicle data sources can include a vehicle sensor and a computing device to process sensor data.

The vehicle sensors can include one or more of a camera, a lidar sensor, an ultrasound sensor and a radar sensor. Output data from the vehicle data sources can be combined by determining weights that determine how output data are combined. Performance can include missing data and sensor noise levels. Output data from the vehicle data sources can include a location of an object in an environment around the vehicle. Operating the vehicle can include determining a vehicle path based on the location of the object in the environment around the vehicle. The vehicle can be operated along the vehicle path by controlling vehicle powertrain, steering and brakes. Reinforcement learning can include training the deep neural network when pairs of inputs and ground truth are not available prior to operation of the system. A reward function corresponding to fusion weights can be determined for several time steps. Ground truth used to train the deep neural network can include a vehicle performance index.

Further disclosed is a computer readable medium, storing program instructions for executing some or all of the above method steps. Further disclosed is a computer programmed for executing some or all of the above method steps, including a computer apparatus, programmed to determine performance of a plurality of vehicle data sources used to operate a vehicle by evaluating each vehicle data source output data and train a deep neural network to determine reliability for each of the vehicle data sources based on the performance using reinforcement learning. Output data from the vehicle data sources can be combined using the deep neural network to correlate output data from one or more vehicle data sources to the performance to determine how accurately the output data from each vehicle data source corresponds to vehicle performance; and the vehicle can be operated based on the combined output data. Which data sources to include in the vehicle can be combined based on the reliability. Which data sources are operating correctly can be determined based on the reliability. Performance of each vehicle data source can be based on measures of vehicle operation including at least one of collision probability, fuel consumption, or travel time. Each of the vehicle data sources can include a vehicle sensor and a computing device to process sensor data.

The computer can be further programmed to include vehicle sensors including one or more of a camera, a lidar sensor, an ultrasound sensor and a radar sensor. Output data from the vehicle data sources can be combined by determining weights that determine how output data are combined. Performance can include missing data and sensor noise levels. Output data from the vehicle data sources can include a location of an object in an environment around the vehicle. Operating the vehicle can include determining a vehicle path based on the location of the object in the environment around the vehicle. The vehicle can be operated along the vehicle path by controlling vehicle powertrain, steering and brakes. Reinforcement learning can include training the deep neural network when pairs of inputs and ground truth are not available prior to operation of the system. A reward function corresponding to fusion weights can be determined for several time steps. Ground truth used to train the deep neural network can include a vehicle performance index.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
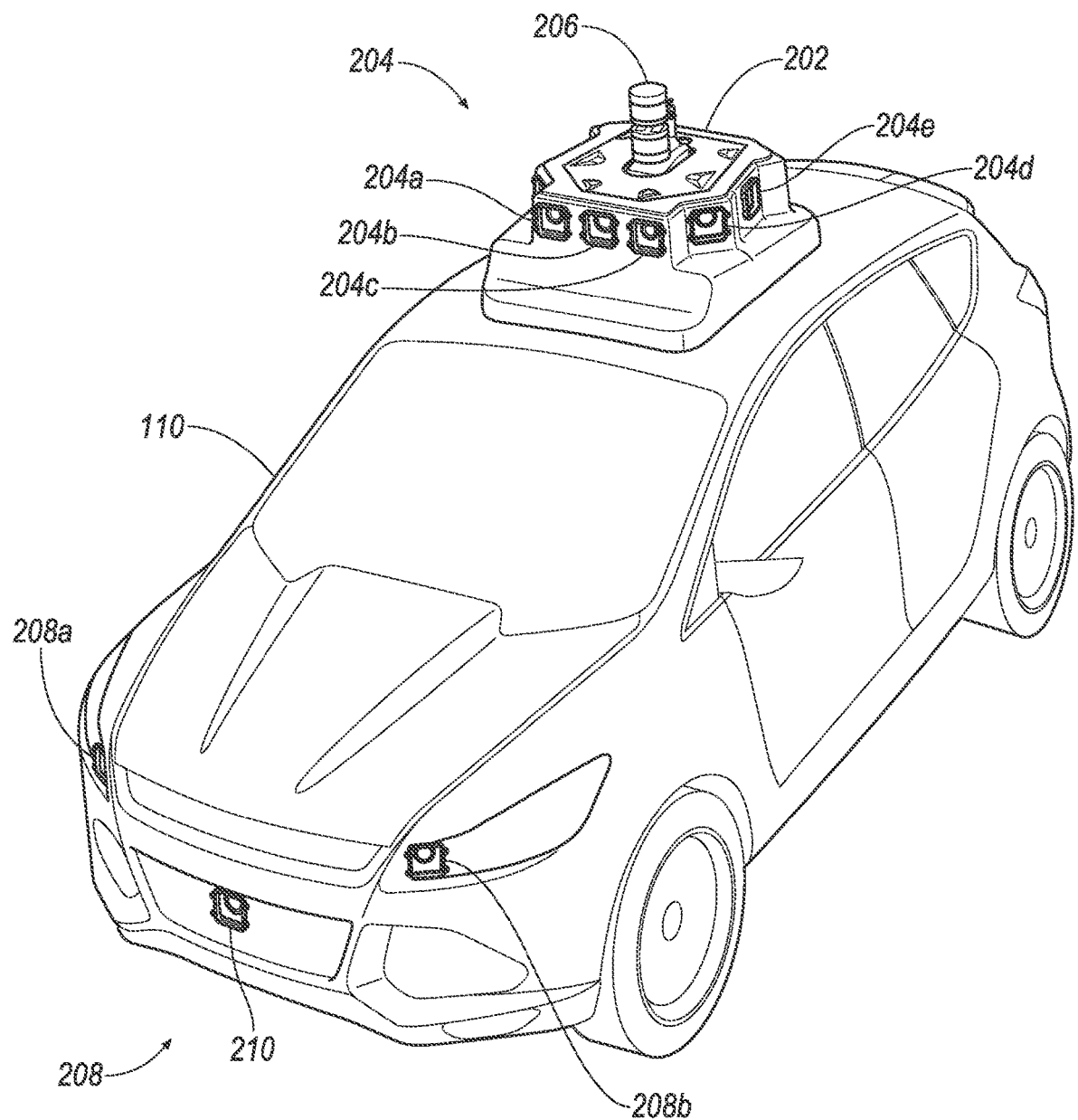
FIG. 2 is a diagram of an example vehicle with a plurality of sensors.

FIG. 2 is a diagram of a vehicle 110 including a plurality of vehicle sensors 116 corresponding to a plurality of sensor modalities. Attached to the roof of vehicle 110 is a sensor pod 202. Sensor pod 202 houses a lidar sensor 206 and five color cameras 204a, 204b, 204c, 204d, 204e (collectively cameras 204). Included on the front of vehicle 110 are two radar sensors 208a, 208b (collectively radar sensors 208) and an ultrasound sensor 210. Each sensor 204, 206, 208, 210 can be connected to one or more computing devices 115 that acquire data output from the sensors 204, 206, 208, 210 and processes the data to determine data regarding different portions of an environment around the vehicle 110.

For example, sensors 204, 206, 208, 210 can be connected to computing devices 115 executing software processes that acquire data from sensors 204, 206, 208, 210 and process the acquired data to locate objects in an environment around a vehicle 110. Objects can include roadways, lane markings, other vehicles and pedestrians, for example. Each sensor 204, 206, 208, 210 and computing device 115 combination can be a data source that provide output data regarding object locations to a computing device 115. A computing device can receive output data from a plurality of data sources and combine the output data to determine a location for an object in an environment around a vehicle 110. The computing device 115 can use the object location to operate the vehicle 110. For example, a computing device 115 can use an object location to determine a vehicle path that avoids contact with an object.

A "vehicle" can include platforms (i.e., devices or systems of devices including hardware and software) other than a vehicle 110 and can include multiple sensors acquiring multiple modality data. For example, a vehicle can include mobile and stationary robots that acquire output data from a variety of data sources to guide a robot end effector to complete a task. A robot end effector is a tool attached to a robot that accomplishes a task. Examples of robot end effectors include grippers which attach and detach from a workpiece to hold or move the workpiece, sprayers which deposit coatings and glues and various tools including screwdrivers, chisels, hammers, etc. that assemble or disassemble workpieces. Robots can acquire output data regarding paths and workpieces from data sources installed on the robot itself or from sensors installed in the workplace in which the robot is operating. Each data source can include a sensor and a computing device that determines data regarding a robot's location and orientation, the location and orientation of one or more end effectors and the location and orientation of one or more workpieces.

Another example of a vehicle using multiple sensor modalities applied to an automated task is speech recognition. In speech recognition, multiple data sources including microphones, radios, broadband networks and cell phones can be used to acquire audio data. Each audio data source can be processed using a variety of different processing schemes to extract features from the audio data for further processing. For example, mel cepstrum features and per channel energy are two different pre-processing techniques for extracting features from audio data. Different pre-processing techniques can extract features from audio data with different accuracy and reliability depending upon the signal strength and signal to noise ratio of the input audio data. Features extracted from audio data can be passed onto a speech recognition neural network to perform speech recognition tasks. Optimal speech recognition can depend upon the accuracy and reliability of feature extraction. Determining the accuracy and reliability of input features can improve the manner in which input audio features are combined to input to a speech recognition system and thereby improve the quality of speech transcription performed.

Techniques disclosed herein improve automated tasks including vehicle operation, robot guidance and speech recognition by providing an adaptive scheme based on reinforcement learning that can automatically tune the degree of confidence assigned to various data sources to guide fusion of multiple data sources for input to an automated task. In addition to vehicle operation, robot guidance and speech recognition, any system that includes multiple data sources including one or more sensor modalities and processing schemes can benefit from adaptive sensor fusion as described herein.

Figure 3:
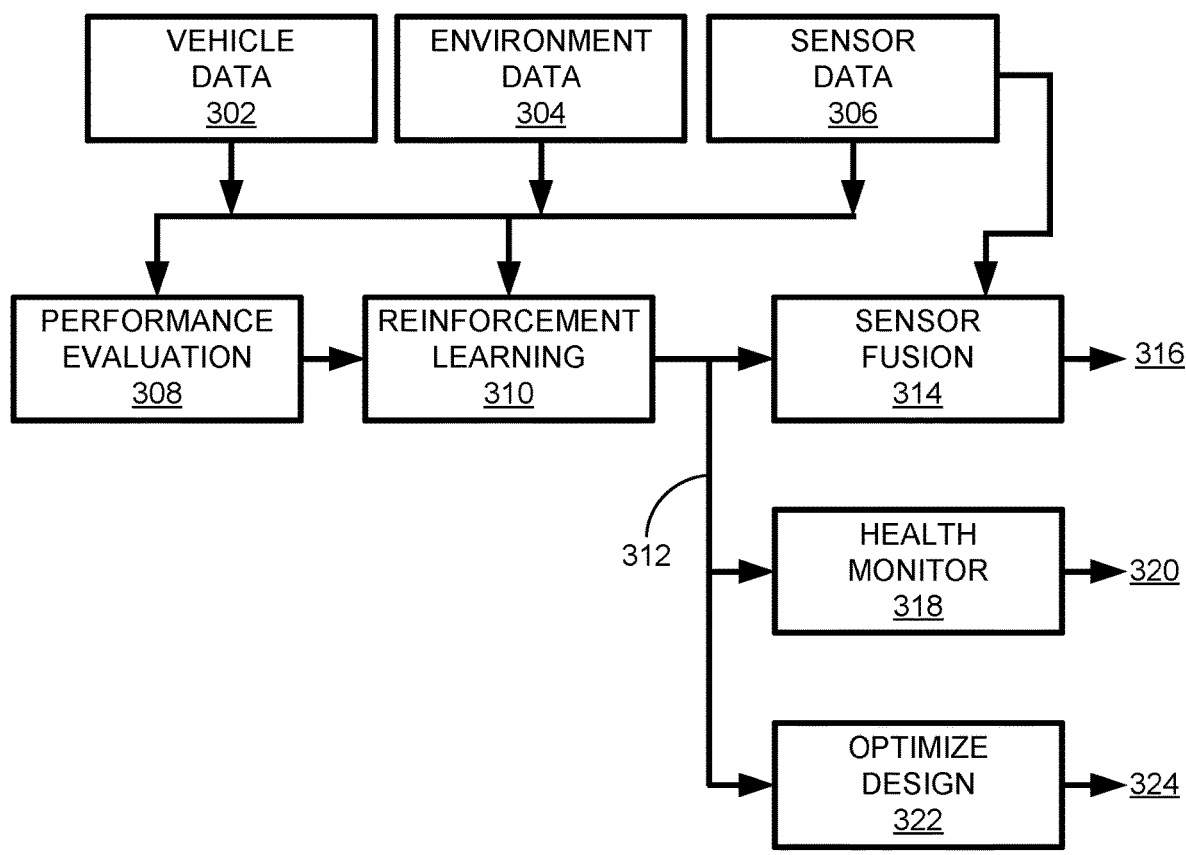
FIG. 3 is a diagram of an example system to perform vehicle sensor fusion.

FIG. 3 is a diagram of an adaptive sensor fusion system 300. Adaptive sensor fusion system 300 is a system based on reinforcement learning (REINFORCEMENT LEARNING) 310 that determines confidence levels applied to a plurality of vehicle sensors 116 using fusion weights 312 assigned to various data sources (SENSOR DATA) 306 for sensor fusion (SENSOR FUSION) 314. An adaptive sensor fusion system 300 is used to change or adapt the manner in which data from multiple sensors is combined in a multi-sensor, multi-modality vehicle system as the measured reliability or accuracy of the sensors change over time. An adaptive sensor fusion system 300 can fuse sensor data for multi-sensor vehicle 110 operation, multi-sensor mobile or stationary robotic guidance, speech recognition, and, in general, any complex system that relies on multiple data sources to accomplish a task. Adaptive sensor fusion system 300 uses reinforcement learning 310 to determine fusion weights 312 input to sensor fusion 314 that determine how multi-modality data sources 306 will be combined or fused by sensor fusion 314 to be output as output data 316. Reinforcement learning 310 inputs performance evaluation (PERFORMANCE EVALUATION) 308 of multi-modality data sources 306 to learn which of the various data sources 306 included in vehicle 110 are providing the most reliable data.

Adaptive sensor fusion system 300 begins by inputting vehicle data (VEHICLE DATA) 302, environmental data (ENVIRONMENTAL DATA) 304 and data sources (SENSOR DATA) 306 to performance evaluation 308. Vehicle data 302 includes data regarding the operation of a vehicle acquired from vehicle sensors 116 and processed by a computing device 115 including an inertial measurement unit (IMU), a global positioning system (GPS) and wheel rotation sensors. Data from vehicle sensors 116 can be used to measure vehicle location, orientation and data regarding latitudinal and longitudinal accelerations and when combined with data regarding vehicle powertrain, steering and brakes can determine tire slippage and vehicle skidding, for example. Vehicle data 302 from vehicle sensors 116 can be used to determine collision probability, fuel consumption, or travel time, for example. Vehicle data 302 can also include differences between intended operation of a vehicle 110 corresponding to commands sent to powertrain, steering, and brake controllers 112, 113, 114 and actual operation of the vehicle 110 as measured by vehicle sensors 116.

Also input to performance evaluation 308 is environmental data 304. Environmental data 304 includes data regarding outside temperature, atmospheric pressure and precipitation, for example. Environmental data 304 can indicate possible sources of sensor degradation like rain and ice forming on vehicle sensors 116 and possible sources of degraded vehicle 110 operation like roadway snow and ice.

Data sources 306 include output data from multiple sensors and a computing device to process sensor data. Sensor data can be processed to determine data used to operate a vehicle 110, for example. Examples of data sources 306 include data acquired from cameras and processed using a computing device to locate objects in an environment around a vehicle. Camera data can be processed with a convolutional deep neural network, for example, to locate other vehicles and pedestrians around a vehicle 110. Lidar sensor data can be processed using Bayesian inference to locate objects in an environment around a vehicle 110, where Bayesian inference determines a probability that a data point in point cloud data corresponding to range data acquired by a lidar sensor belongs to an object in an environment depends upon a previously determined probability of an object being in the environment. Similarly, data acquired by a radar sensor and data acquired by a sonar sensor can be processed to determine the presence or absence of an object in an environment around a vehicle 110. Object location data acquired and determined based on video, lidar, radar and sonar sensor data can be output to performance evaluation 308 along with vehicle data 302 and environmental data 304.

Performance evaluation 308 substantially continuously inputs vehicle data 302, environmental data 304, and data sources 306 and uses the input data to update a reward/cost value that evaluates the performance of the vehicle 110. For example, if vehicle data 302 indicates that vehicle 110 has contacted an object, for example another vehicle, or the wheels of the vehicle 110 are slipping, performance evaluation 308 would determine a negative reward/cost value, referred to as a performance index, to output to reinforcement learning 310. Performance evaluation can output a negative value corresponding to reduced vehicle performance caused by missing data or increased sensor noise level. Missing data or an increased sensor noise level can be caused by sensor failure or sensor obscuring caused by weather or contamination. In general, vehicle 110 operation that conformed to expected performance based on data sources 306 determines a positive reward/cost value and vehicle 110 operation that does not conform to expected behavior will result in a negative reward/cost value output to reinforcement learning. As the vehicle 110 operates in a more desired fashion, performance evaluation 308 outputs a higher performance index, and as the vehicle 110 operates in a less desirable fashion performance evaluation 308 outputs a lower performance index. Reinforcement learning 310 uses the performance index to learn which data sources 306 correspond to desired operation of the vehicle 110 and which data sources 306 correspond to less desirable operation of the vehicle 110.

Reinforcement learning is a deep neural network that inputs vehicle data 302, environmental data 304, and data sources 306 and outputs fusion weights 312. Reinforcement learning is a technique for training a deep neural network where pairs of inputs and ground truth values are not available. Ground truth refers to data regarding desired output results from a deep neural network determined independently from the deep neural network. Reinforcement learning is a technique for training deep neural networks when pairs of inputs and ground truth are not available prior to operation of the system, for example where the reward/loss function for training the deep neural network is the result of a multi-step process where the reward/loss value is a function that can be several time steps removed from the immediate results output by the deep neural network. For example, the reward/loss value associated with fusion weights 312 output from the deep neural network included in reinforcement learning 310 might not be determined for several time steps after the time at which the data sources 306 are used for operation of the vehicle 110. Reinforcement learning 310 begins by assuming a value for fusion weights 312 and training the deep neural network to modify the fusion weights 312 at future time steps as performance evaluation 308 receives data that permits calculation of reward/loss functions. In this manner reinforcement learning 310 trains the included deep neural network as results are available from operation of the vehicle 110, where reinforcement learning determines optimal fusion weights 312 over time as the adaptive sensor fusion system 300 interacts with data from the environment determined via vehicle 110 sensors 116.

Reinforcement learning 310 includes multiple deep neural networks that output multiple fusion weights 312, for example $w_L$, $w_R$, $w_S$, and $w_C$ corresponding to distance measurements $D_L$, $D_R$, $D_S$ and $D_C$ respectively output by data sources 306 corresponding to object locations for lidar, radar, sonar and video camera, respectively. Sensor fusion (SENSOR FUSION) 314 inputs the fusion weights 312 and data sources 306 and produces output data 316 D corresponding to a single distance measure to an object according to the equation:

$$D = w_L D_L + w_R D_R + w_S D_S + w_C D_C \quad (1)$$

Where D corresponds to the fused distance measure.

Fusion weights 312 are also passed to a system health monitor (HEALTH MONITOR) 318 that compares the fusion weights 312 to previously acquired fusion weights 312 to determine changes in data sources 306, where a decrease in a weight corresponding to a particular sensor can indicate that the sensor is no longer operating reliably. In one example, each fusion weight w can be compared to a pre-set threshold values T. When the weighting value corresponding to a sensor drops below a threshold, i.e. w<T, sensor performance can be determined to be below the expected level and generate an alert 320 output by the health monitoring system. For example, if a camera is obscured by dirt or ice and no longer producing reliable data, reinforcement learning 310 would output fusion weights 312 that reflect the lower reliability of the camera. Health monitor 318 would output an alert 320 to vehicle 110 computing device 115 to initiate cleaning or request service, for example.

Design optimization (OPTIMIZE DESIGN) 322 logs fusion weights 312 over time and outputs the log data 324 to a process that determines the performance of the system over long periods of time. Reliability levels are learned by reinforcement learning 310 and assigned to each sensor are stored by design optimization to assist in designing subsequent systems. For example, if video cameras placed in certain locations on a vehicle 110 are consistently being obscured by mud or snow, that will be reflected in reduced reliability data in log data 324 output by design optimization 322. Future vehicles 110 can include equipment to clean lens covers on those particular sensors or the sensors can be relocated to reduce unreliable or missing data. If some sensors prove to be unreliable due to mechanical or electronic failures, the sensors can be replaced or re-designed to improve reliability based on log data 324 output by design optimization 322. If log data 324 shows that a particular sensor is redundant and adds little or no reliability to the vehicle 110, the sensor can be removed in future models.

Figure 4:
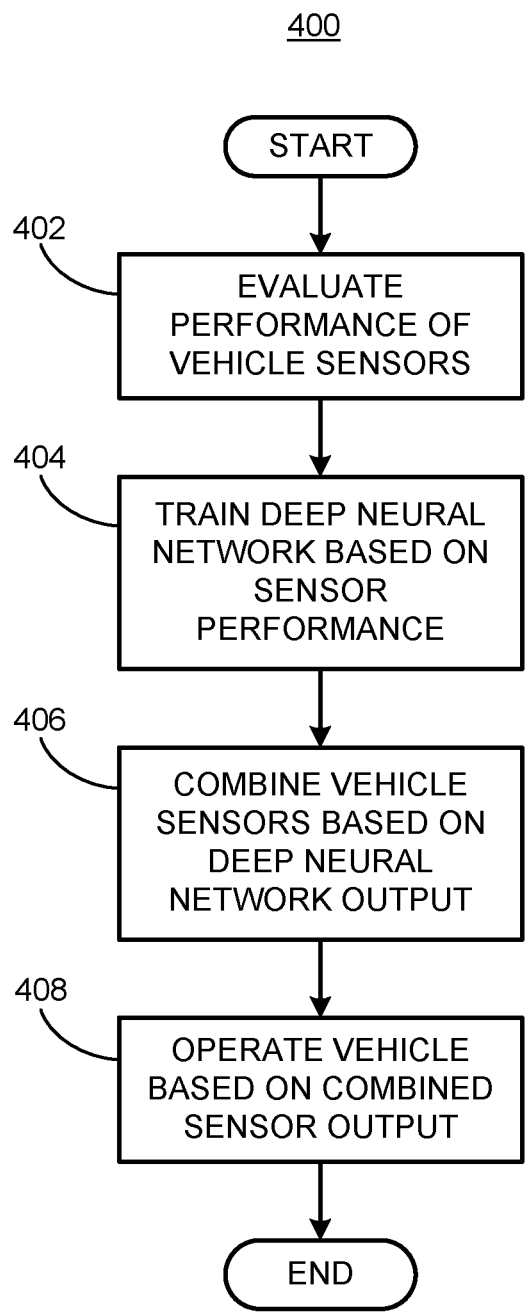
FIG. 4 is a flowchart diagram of an example process to operate a vehicle using a deep neural network to perform sensor fusion.

FIG. 4 is a diagram of a flowchart, described in relation to FIGS. 1-4, of a process 400 for operating a vehicle based on output from an adaptive sensor fusion system 300. Process 400 can be implemented by a processor of computing device, taking as input information from sensors, and executing commands, and outputting object information, for example. Process 400 includes multiple blocks that can be executed in the illustrated order. Process 400 could alternatively or additionally include fewer blocks or can include the blocks executed in different orders.

Process 400 begins at block 402, where performance of vehicle sensors 116 included in a vehicle 110 are evaluated. Performance of vehicle sensors 116 is performed by inputting vehicle data 302, environmental data 304 and data sources 306. Data sources include vehicle sensor data 116 processed by computing devices to yield data regarding objects in an environment around a vehicle 110, for example. Data sources can include vehicle sensor 116 data from a variety of sensor modalities including lidar, radar, sonar and video data, for example. In examples of adaptive sensor fusion, data sources can be included in one or more of a stationary or mobile robot and a speech recognition system. Performance of vehicle sensors 116 can be output as a performance index to be input to a reinforcement learning 310 deep neural network. Performance of vehicle sensors 116 can also be determined by a reinforcement learning subsystem 400.

At block 404 process 400 trains a reinforcement learning 310 deep neural network or reinforcement learning subsystem 400 based on the performance index from block 402. As discussed above in relation to FIG. 4, the training process will cause adaptive sensor fusion system 300 to converge on a stable set of fusion weights 312 to output to sensor fusion 314. The adaptive sensor fusion system 300 determines how accurately the output data from each data source 306 corresponds to vehicle 110 performance and determines fusion weights 312 that combine the data sources 306 according to the determined sensor accuracy.

At block 406 the adaptive sensor fusion system 300 combines the data sources 306 by sensor fusion 314 which calculates a single value according to equation (1) corresponding to a measurement value for the plurality of vehicle sensors 116 and data sources 306, in this example a distance D from a vehicle 110 to an object in an environment around a vehicle. The single measurement distance D can be output as output data 316 from sensor fusion 314 to a computing device 115 included in a vehicle 110.

At block 408 the output data 316 corresponding to a distance D to an object in an environment around a vehicle 110 is output from adaptive sensor fusion system 300 and received by a computing device 115. The computing device 115 can use the output data 316 to determine a vehicle path and control vehicle powertrain, steering and brakes to cause vehicle 110 to operate along the vehicle path as described above to avoid contact with the object. Computing device 115 can also be included in a stationary or mobile robot and use the output data 316 to guide the robot or end effectors. In other examples computing device 115 can use output data 316 to guide a speech recognition process to select which data source 306 to interpret as speech. Following block 408 process 400 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising a processor; and a memory, the memory including instructions executable by the processor to:
   determine performance of a plurality of vehicle data sources used to operate a vehicle by evaluating each vehicle data source output data;
   train a deep neural network to determine reliability for each of the vehicle data sources based on the performance using reinforcement learning;
   combine output data from the vehicle data sources based on the reliability including using the deep neural network to correlate output data from one or more vehicle data sources to the performance to determine how accurately the output data from each vehicle data source corresponds to vehicle performance; and
   operate the vehicle based on combined output data.

2. The computer of claim 1, the instructions including further instructions to determine which data sources to include in the vehicle based on the reliability.

3. The computer of claim 1, the instructions including further instructions to determine which data sources are operating correctly based on the reliability.

4. The computer of claim 1, the instructions including further instructions to determine performance of each vehicle data source based on measures of vehicle operation including at least one of collision probability, fuel consumption, or travel time.

5. The computer of claim 1, wherein each of the one or more vehicle data sources includes a vehicle sensor and a computing device to process sensor data.

6. The computer of claim 5, wherein the vehicle sensors include one or more of a camera, a lidar sensor, an ultrasound sensor and a radar sensor.

7. The computer of claim 1, the instructions including further instructions to combine output data from the vehicle data sources by determining weights that determine how output data are combined.

8. The computer of claim 1, wherein performance includes missing data and sensor noise levels.

9. The computer of claim 1, wherein output data from the vehicle data sources includes a location of an object in an environment around the vehicle.

10. The computer of claim 9, wherein operating the vehicle includes determining a vehicle path based on the location of the object in the environment around the vehicle.

11. A method, comprising:
    determining performance of a plurality of vehicle data sources used to operate a vehicle by evaluating each vehicle data source output data;
    training a deep neural network to determine reliability for each of the vehicle data sources based on the performance using reinforcement learning;
    combining output data from the vehicle data sources including using the deep neural network to correlate output data from one or more vehicle data sources to the performance to determine how accurately the output data from each vehicle data source corresponds to vehicle performance; and
    operating the vehicle based on the combined output data.

12. The method of claim 11, further comprising determining which data sources to include in the vehicle based on the reliability.

13. The method of claim 11, further comprising determining which data sources are operating correctly based on the reliability.

14. The method of claim 11, further comprising determining performance of each vehicle data source based on measures of vehicle operation including at least one of collision probability, fuel consumption, or travel time.

15. The method of claim 11, wherein each of the vehicle data sources includes a vehicle sensor and a computing device to process sensor data.

16. The method of claim 15, wherein the vehicle sensors include one or more of a camera, a lidar sensor, an ultrasound sensor and a radar sensor.

17. The method of claim 11, further comprising combining output data from the vehicle data sources by determining weights that determine how output data are combined.

18. The method of claim 11, wherein performance includes missing data and sensor noise levels.

19. The method of claim 11, wherein output data from the vehicle data sources includes a location of an object in an environment around the vehicle.

20. The method of claim 19, wherein operating the vehicle includes determining a vehicle path based on the location of the object in the environment around the vehicle.

\* \* \* \* \*